United States Patent [19]

Richards

[11] 4,141,440
[45] Feb. 27, 1979

[54] BLOCKER AND JAW CLUTCH ASSEMBLY

[75] Inventor: Elmer A. Richards, Kalamazoo, Mich.

[73] Assignee: Eaton Corporation, Cleveland, Ohio

[21] Appl. No.: 802,684

[22] Filed: Jun. 2, 1977

[51] Int. Cl.² .......................... F16H 3/38; F16D 13/00
[52] U.S. Cl. ..................................... 192/53 F; 74/339
[58] Field of Search ............. 192/53 F, 67 A; 74/331, 74/339

[56] References Cited

U.S. PATENT DOCUMENTS

| Re. 29,601 | 4/1978 | Richards | 192/53 F X |
|---|---|---|---|
| 2,942,712 | 6/1960 | Altmann | 192/53 F X |
| 3,856,121 | 12/1974 | Usui et al. | 192/53 F |
| 3,861,509 | 1/1975 | Inoue et al. | 192/53 F |
| 3,924,484 | 12/1975 | Richards | 192/53 F X |
| 3,983,979 | 10/1976 | Richards | 74/339 X |

Primary Examiner—Lance W. Chandler
Attorney, Agent, or Firm—H. D. Gordon

[57] ABSTRACT

Improved blocker and jaw clutch means for shiftable change speed gearing is provided for effecting engagement of the low speed gearing of a simple transmission, or the low speed gearing of the main transmission section of a splitter type compound transmission. A transmission having an input shaft driven by a one-way prime mover, a main shaft and at least one countershaft, and including pairs of shiftable gears arranged on and cooperatively between said shafts, is provided with positive clutches, preferably spring loaded jaw clutches, for effecting connection to one of said shafts of a selected one gear of a selected one of said pairs of said gears upon the achievement of substantial synchronization between such gear and such shaft. Blockers are provided for protecting the positive clutch teeth from excessive wear during such shifting. At least one of said jaw clutches, preferably the jaw clutch for engaging the low speed pair of gears in a simple transmission, or the jaw clutch for engaging the low speed pair of gears in the main transmission section of a splitter type compound transmission, is provided with an improved blocker effective to sense only one type of nonsynchronous condition, namely, that condition corresponding to one of the clutch members overspeeding the other clutch member but not effective to sense the other clutch member overspeeding the one clutch member. The provision of improved blockers effective to sense only one type of nonsynchronous condition, and effective to prevent or block a clutch engagement only upon the sensing of that one type of nonsynchronous condition, is an improvement since the possibility of such blocker being incorrectly positioned or sensing a false nonsynchronous condition is substantially reduced or eliminated.

12 Claims, 12 Drawing Figures

BLOCKER AND JAW CLUTCH ASSEMBLY

BACKGROUND OF THE INVENTION

1. Field of the Invention

This invention relates to improved blocker and jaw clutch assemblies for shiftable change speed gear devices, preferably multiple countershaft transmissions driven by one-way prime movers and having resiliently yieldable shifting means for substantially simplifying shifting of the transmissions, and in particular relates to an improved blocker means effective to sense only one type of nonsynchronous condition.

2. Background of the Invention

In the design of transmissions, particularly heavy duty transmissions, such as used in trucks, there has existed for a long time the problem of shifting the transmission to the various speed ratios, which problem is even greater when the transmission is provided with an auxiliary transmission section of the range or the splitter type for increasing the number of speed ratios. In most known transmissions, the shifting process is either relatively difficult and/or the shifting mechanism is relatively complex. Thus, there has been a continuing effort in the design of transmissions to improve the shifting, to improve the rapidity of shifting, to reduce the complexity of the shifting mechanism, and to reduce its costs. Hence, without detracting in any way from the operability or desirability of many of the shifting mechanisms previously known, it may be stated that in the present invention these general objectives are accomplished to even a greater degree than has been previously possible.

Particularly, most previously known transmissions have required a relatively high level of operator skill or necessarily utilized synchronizers, of which many different types are known, for causing the speed of the jaw or tooth clutch members to be substantially synchronized prior to permitting their interengagement during a shifting sequence from one speed ratio to another speed ratio. While the use of synchronizers does permit the shifting operation to be performed, their use, as is already known, imposes certain requirements of weight, space and power which is desirable to ease, or avoid entirely, if possible.

These and other problems incident to previously known transmissions were set forth and acknowledged in U.S. Pat. Nos. 3,799,002, entitled "TRANSMISSION WITH RESILIENTLY LOADED MAIN SHAFT GEARS"; 3,910,131, entitled "TRANSMISSION WITH SNAP SHIFT"; 3,921,469, entitled "TRANSMISSION WITH RESILIENTLY LOADED MAIN SHAFT GEARS", 3,924,484, entitled "SENSOR UNBLOCKING RAMPS"; and 3,983,979, entitled "SENSOR UNBLOCKING RAMPS"; all hereby incorporated by reference and all issued to the present applicant and assigned to the same assignee as the present application. Apparatus was disclosed in the above mentioned patents which effectively meets the problems while providing a reliable, effective and efficient transmission, particularly for heavy duty use.

While both forms of the inventions disclosed in said patents, namely, those using blockers and those not using blockers, are effective for carrying out the objectives thereof, it has been noted that for the usual reasons both noise and clutch tooth wear can be minimized by the use of blockers are set forth in said patents and since the date thereof a considerable amount of investigation has been carried out related thereto, both for simplifying of the blocker structure and for improving the operation of said blockers and of transmissions utilizing same. Blockers of various types are well known in the prior art and examples thereof may be seen by reference to the above mentioned patents and to U.S. Pat. No. 3,503,280, entitled, "BLOCKER DEVICE", issued to W. C. Bopp, and assigned to the assignee of this application.

Blockers of the type illustrated in the above mentioned patents are generally nondeformable devices designed to prevent, or block, the engagement of the axially engageable jaw clutch members of a jaw clutch when said members are rotating at substantially different speeds, i.e., are not substantially synchronized. Such blockers are generally retained on one clutch member for rotation therewith with a limited amount of relative rotation (3°-15°) provided. The blocker and the one clutch member will define an array of projections or the like which will allow the one clutch member to move relatively axially towards the other clutch member when in alignment but will block such relative axial movement when said blocker is rotated in either the clockwise or counterclockwise direction relative to the one clutch member. The blocker is designed to be in frictional contact with the second clutch member during an engaging operation and, thus, tends to rotate therewith.

By way of example, assuming the use of a prior art blocker and that the clutch members are rotating in a clockwise direction, if the first clutch member is rotating faster than the second clutch member, upon initiation of an engaging operation the blocker will be rotated counterclockwise relative to the first clutch member and the blocker will prevent axial movement of the first clutch member towards the second clutch member. If the second clutch member is rotating faster than the first clutch member, the blocker will be rotated clockwise relative to the first clutch member and the blocker will prevent axial movement of the first clutch member towards the second clutch member. If the first clutch member initially rotated faster, then slower than the second clutch member, the blocker would, relative to the first clutch member, rotate in a clockwise direction from an initial counterclockwise rotated position relative to the first clutch member towards a relatively clockwise rotated position. During the relative rotation, for at least a limited period of time, the blocker would align with the first clutch member and cease to block axial movement thereof towards the second clutch member. Such movement of the blocker is generally referred to as "passing through synchronous". The clutch will "pass through synchronous" or "cross synchronous" as the two clutch members reach a substantially synchronous rotation, and the clutch engaging operation, or the gear shift, should be completed at this time. As the blocker is designed to be in constant frictional contact with the second clutch member only during a clutch engaging operation to prevent undue frictional wear, it was possible, under certain conditions, that the blocker would be set up on the "wrong side of synchronous" at the initiation of a clutch engaging operation, i.e., rotated clockwise relative to the first clutch member when the first clutch member was rotating faster than the second clutch member or vice versa. Under such conditions, especially with the vehicle stopped, it was difficult and/or impossible to cause the blocker to "pass through synchronous" and thus difficult and/or impossible to cause the transmission to be shifted into the desired gear ratio.

For those somewhat unusual operating conditions when the blocker would be improperly positioned relative to the first clutch members, the required shift (clutch engagement) could occur if a self-aligning mechanism was provided to align the blocker with the first jaw clutch member or if the blocker was caused to set up on the opposite side of synchronous such as by a momentary reversing of the main shaft. Such a momentary reversing could usually be obtained by momentarily shifting from neutral into reverse. But this was obviously an inconvenience, a highly undesirable technique, and might hamper the commercial acceptability of an otherwise highly successful transmission. Self-aligning mechanisms are usually effective but require rather complicated structure and usually require an input shaft brake. One method of minimizing or eliminating this problem involved the use of the structures illustrated in U.S. Pat. No. 3,924,484 and 3,983,979, mentioned above and incorporated by reference. While this method has proven highly effective, an improvement appeared obtainable as to the positive clutch and blocker associated with at least the low-speed gears.

SUMMARY OF THE INVENTION

In accordance with the present invention, one of the drawbacks of the prior art has been overcome by the utilization of an improved blocker device in connection with the jaw clutch utilized to engage the low speed gearing of a simple transmission, or the jaw clutch utilized to engage the low speed gearing of the main transmission section of a splitter type compound transmission, which is effective to sense, and prevent a clutch engagement, in only one type of nonsynchronous condition. The use of a blocker effective to prevent a clutch engagement in only one type of nonsynchronous condition minimizes or eliminates the possibility that said blocker may inadvertently be caused to incorrectly sense the other type of nonsynchronous condition or that the blocker will become incorrectly set up on the side of synchronous corresponding to the type of nonsynchronous condition not sensed and thereby become unable to sense the subsequent achievement of a substantially synchronous condition to allow, or unblock, a clutch engagement. Further, as it is impossible to upshift a simple transmission into low gear, or to upshift a splitter type compound transmission into the low splitter range, the provision of a blocker device effective to sense and prevent a shift in the event that the clutch member associated with the transmission input overspeeds the clutch member associated with transmission output has, for certain situations, been found to be, as a practical matter, unnecessary.

Accordingly, it is an object of the present invention to provide a new and improved blocker means for use with the positive clutch associated with the low speed gear ratio of a simple change speed transmission, or the low speed gear ratio of the main transmission section of a splitter type compound change speed transmission.

Another object of the present invention is the provision of a new and improved blocker means for use with a two member positive clutch which is effective to sense a first type of nonsynchronous condition wherein the first clutch member rotates faster than the second clutch member but is ineffective to sense a second type of nonsynchronous conditions wherein the second clutch member overspeeds the first clutch member.

A further object of the present invention is to provide a new and improved blocker means for use with a resiliently shifted change speed transmission of the type having a main shift, a plurality of main shaft gears selectively clutchable to said main shaft and at least one countershaft wherein said blocker is associated with the positive clutch utilized to engage the low speed gear ratio main shaft gear to the main shaft and wherein said blocker is effective to block engagement of said positive clutch only when said main shaft rotates faster than said main shaft gear.

A further object of the present invention is to provide a new and improved blocker and jaw clutch assembly of simpler construction and/or of lower manufacturing cost which will substantially reduce or eliminate the occurrence of said blocker being set up on the wrong side of synchronous and thereby prevented from sensing the subsequent achievement of a substantially synchronous condition.

These and other objects and advantages of the present invention will become apparent from a reading of the detailed description of the preferred embodiment taken in view of the accompanying drawings.

DESCRIPTION OF THE PREFERRED EMBODIMENT

Referring now to the apparatus in detail, it will be recognized that a detailed disclosure of both the construction and operation of blockers and transmissions utilizing same has been set forth and claimed in the above mentioned patents and reference is therefore made thereto for such details.

Figure 1:
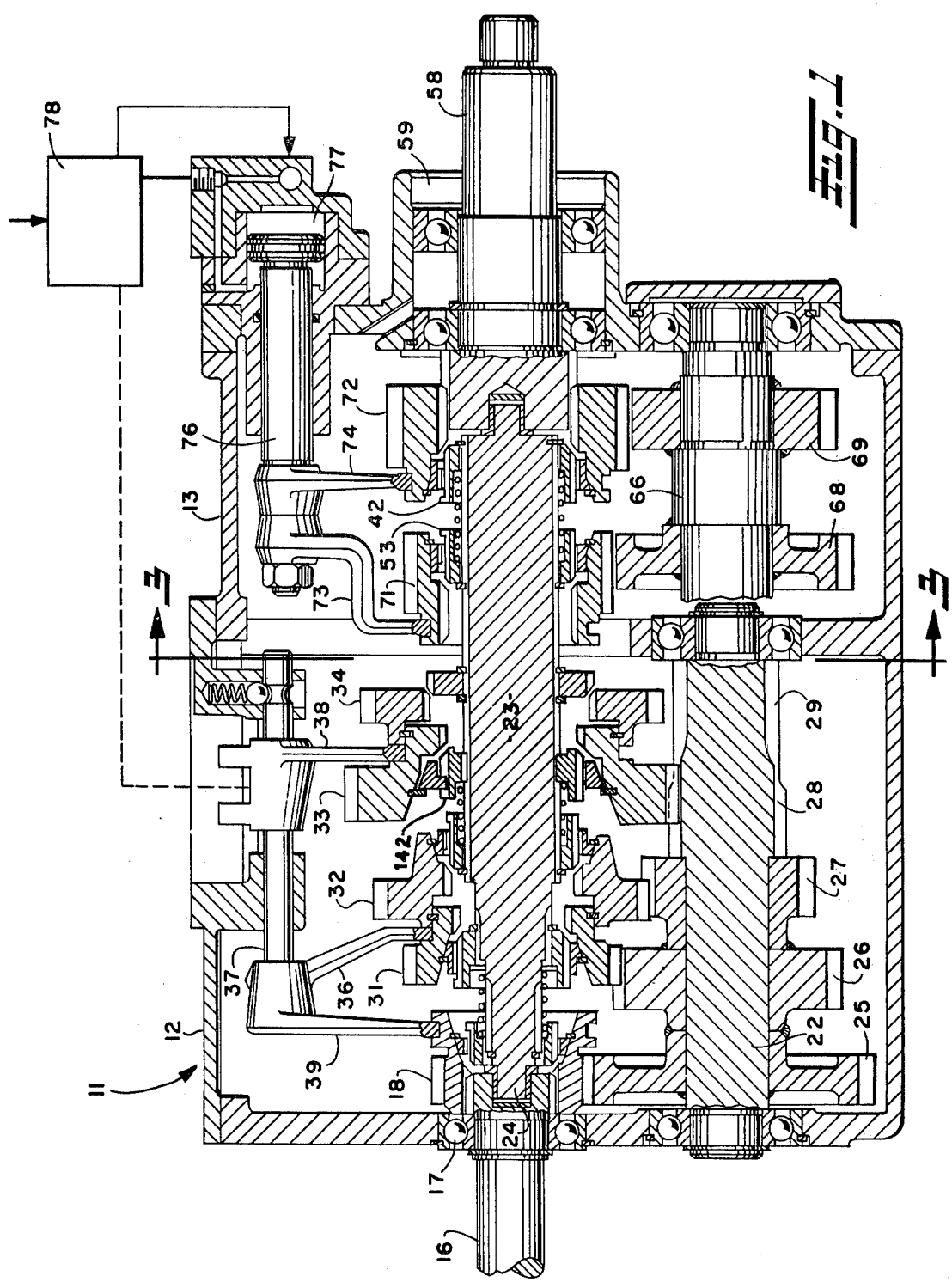
FIG. 1 is a cross-sectional view of a splitter type compound transmission utilizing the improved blocker of the present invention in connection with the positive clutch associated with the main transmission portion low speed gear range and utilizing blockers of the type described in the prior art in connection with the positive clutches associated with other speed ranges, the main transmission portion thereof being taken along the line I—I of FIG. 3 and the auxiliary transmission portion thereof being taken along the line I—IA of FIG. 3.
Figure 2:
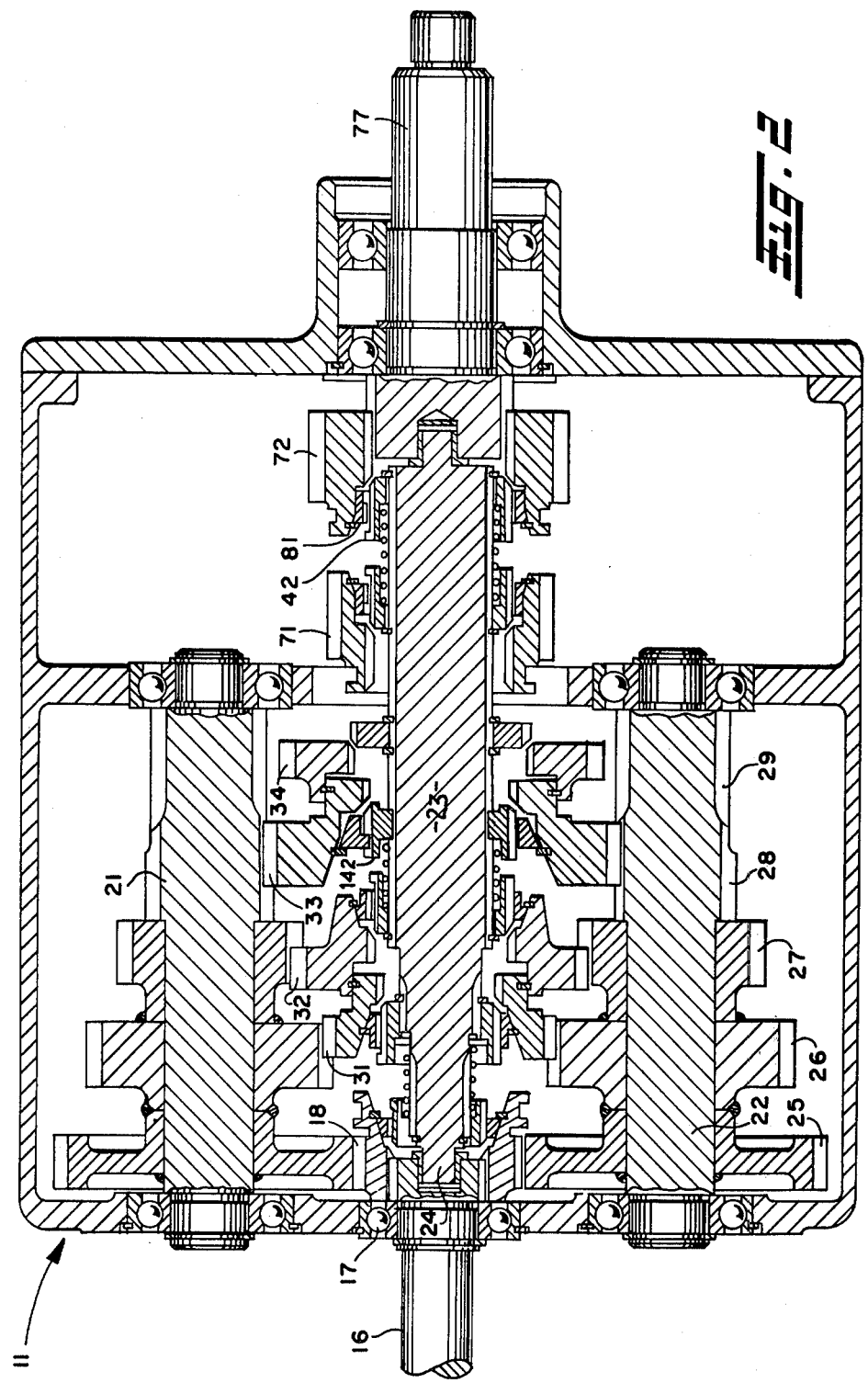
FIG. 2 is a cross-sectional view of said transmission taken substantially along the line II—II of FIG. 3.

Certain terminology will be used in the following description for convenience in reference only and will not be limiting. The words "upwardly", "downwardly", "rightwardly", and "leftwardly" will designate directions in the drawings to which reference is made. The words "forward" and "rearward" will refer respectively to the front and rear ends of the transmission as same is conventionally mounted in the vehicle, being respectively the left and right sides of the transmission as illustrated in FIGS. 1 and 2. The words "inwardly" and "outwardly" will refer to directions toward and away from, respectively, the geometric center of the device and designated part thereof. Said terminology will include the words above specifically mentioned, derivatives thereof, and words of similar import.

The term "simple transmission" is used to designate a change speed transmission wherein the operator may select one of a plurality of single gear reductions. The term "compound transmission" is used to designate a transmission having a main transmission portion and an auxiliary transmission portion whereby the selected gear reduction in the main transmission portion may be compounded by further selected gear reduction in the auxiliary transmission portion. The term "splitter type compound transmission" as used herein will designate a compound transmission wherein the auxiliary transmission is used to provide various selectable steps of the gear ratio selected in the main transmission portion. The term "upshift" as used herein shall mean the shifting from a lower speed gear ratio to a higher speed gear ratio. The term "downshift" as used herein shall mean the shifting from a higher speed gear ratio to a lower speed gear ratio. The terms "low speed gear", "low gear" and/or "first gear" as used herein shall all designate the gear ratio utilized for lowest forward speed operation in a transmission, i.e., that gear having the highest ratio of reduction relative to the input shaft of the transmission.

The improved blocker-jaw clutch means of the present invention is illustrated in connection with a resiliently shiftable change speed transmission of the type having a floating main shaft and a plurality of substantially identical countershafts as may be seen in more detail by reference to the above mentioned U.S. Pat. No. 3,799,002. Although the improved blocker-jaw clutch means of the present invention is illustrated in connection with such a resiliently shiftable change speed transmission, it is understood that the improved blocker-jaw clutch of the present invention may be utilized in connection with any type of axially engageable jaw clutch structure and, in particular, any type of axially engageable jaw clutch structure associated with a shiftable change speed gear transmission.

Insofar as concerns the integration of the improved blocker of the present invention, and the blockers of the prior art, into an entire shiftable change speed transmission system, the blockers are placed between the two relatively axially slidable portions, or members, of at least one and preferably most or all of the transmission positive clutches and the usual friction means are provided for causing the blockers to tend to rotate with one of said members as the clutch members respectively move toward each other during a clutching procedure. One of said clutch members is often formed integrally with a main shaft gear as internal clutch teeth thereof. As the clutching procedure occurs, the blocker limits such relative axial movement until substantial synchronization between the clutch members involved in a given shift is sensed.

The improved blocker of the present invention, and the prior art type blockers, and the other clutch elements of a given clutchable pair of clutch members, are typically provided with slightly angling leading spaces on the blocker teeth to effect an unblocking when the main shaft is otherwise unconnected to any other main shaft gears and hence at a minimum inertia. The angling of said blocker teeth is, however, insufficient to effect unblocking during a normal shift and hence will not interfere with the required function thereof during a normal shift. As may be seen by reference to U.S. Pat. No. 3,921,469 and 3,924,484, both above mentioned, there may further be provided means by which a significant axial drag with a minimum of rotational drag is provided constantly between the blocker ring and the clutch member blocked thereby. Thus, said blocker ring will be axially urged upon axial movement of said last named clutch element into engagement with the driving cone of the other clutch element and will thereby be held in proper position against the effect of its own inertia with respect to the gear associated therewith. This feature tends to assure that the blocker will be in the desired position relative to the clutch member blocked thereby prior to contact with the blocking surface of that clutch member.

Both the prior art blockers and the improved blockers of present invention contain advantageous features in that there is required removal of only one portion of one tooth of a clutch member and the blocker ring is provided with a pair of teeth or projections extending toward the clutch element from which a part of said one tooth has been removed. Said teeth are of sufficient circumferential spacing to straddle the remaining portion of said one tooth when synchronization is achieved for effecting an unblocking condition but at least one of said blocker teeth are themselves of circumferential dimension less than the spacing between the teeth on said clutch element for permitting circumferential shifting thereof in at least one direction and the creation of a blocking condition. The improved blocker of the present invention utilizes one blocker tooth of dimension less than the spacing between the teeth on the clutch element and one blocker tooth of circumferential dimension generally equal to the spacing between the teeth on the clutch element for permitting circumferential shifting thereof and the creation of a blocking condition in one circumferential direction only. Additional groups, each comprising a partially removed tooth on the clutch member and cooperating teeth on the blocker ring, may be provided as desired.

Referring now to the drawings, there is illustrated a resiliently shiftable change speed transmission 11 having both a main transmission section 12 and an auxiliary transmission 13, each of which have a plurality of selectable ratios. The transmission illustrated is generally referred to in the art as a compound transmission and is of the splitter type of compound transmission. The main and auxiliary sections are both suitably enclosed by conventional housing means.

The transmission includes an input shaft 16 supported adjacent its rearward end by a bearing 17 and is provided with an input gear 18, nonrotatably connected thereto, as by splines. The input gear 18 simultaneously drives a plurality of countershafts at equal speeds. In the illustrated embodiment, the transmission is provided with two countershafts, 21 and 22, disposed on diametrically opposite sides of the main shaft 23, which main shaft is coaxially aligned with the input shaft 16 and is provided with a pilot portion 24 on its forward end rotatably received within and supported by the rearward end of the input shaft 16.

Each of the countershafts 21 and 22 is provided with an identical grouping of countershaft gears, 25, 26, 27, 28 and 29 thereon, which groupings form pairs of gears, such as the pair of gears 26, of identical size and number of teeth and disposed on diametrically opposite sides of main shaft 23.

A plurality of main shaft drive gears 31, 32, 33 and 34 encircle the main shaft and are selectively clutchable thereto one at a time by yieldable clutch mechanisms, as described in greater detail hereinafter and in the above incorporated patents.

The main shaft gears, 31, 32 and 33, encircle the main shaft 23, are in continuous meshing engagement with, and are floatingly supported by the diametrically opposite pairs of countershaft gears 26, 27 and 28, respectively, which mounting means and the special advantages resulting therefrom are explained in greater detail in U.S. Pat. Nos. 3,105,395 and 3,335,616, both assigned to the assignee of this application and hereby incorporated by reference. The main shaft gear 34 is the reverse gear and is in continuous meshing engagement with a pair of countershaft gears 29 by means of conventional intermediate gears (not shown). The forwardmost countershaft gears 25 are continually meshed with and driven by the input gear 18 for causing simultaneous rotation of the countershaft 21 and 22 whenever the input shaft is rotatably driven. As illustrated in FIG. 1, the input gear 18 is connected to a conventional shift fork 39, which shift fork is controlled by the shift rod 37 for permitting input gear 18 to be shifted axially for selectively permitting direct driving engagement between the input shaft 16 and the main shaft gear 23.

The main shaft gears 31 and 32 are axially interconnected to form a gear pair and are connected to a conventional shift fork 36. The position of the shift fork 36 being controlled in a conventional manner by means of appropriate shift rods similar to rod 37. The main shaft gear pair 31-32 is this shiftable axially relative to main shaft 23 in response to axial shifting of the fork 36 by said rod. However, the gears 31 and 32 are independently rotatable relative to one another. In a similar manner, the main shaft gears 33 and 34 are also axially interconnected so as to be axially shiftable as a pair by means of the shift fork 38, which shift fork is also controlled by appropriate shift means. The main shaft gear pair 33-34 is likewise and similarly axially movable relative to the main shaft 23 and independently rotatable.

Figure 3:
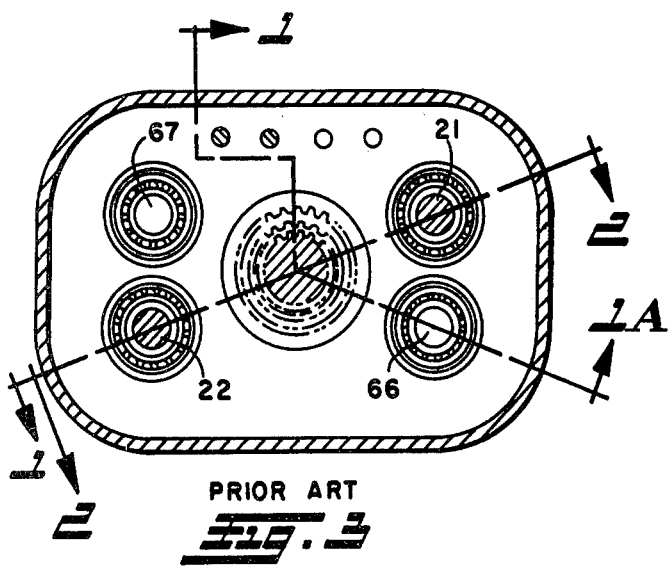
FIG. 3 is a sectional elevational view taken along the line III—III of FIG. 1.

Considering now the splitter auxiliary section 13, the main shaft 23 extends thereinto and is coaxially arranged with and piloted into an output shaft 58 which is in turn supported within the housing 13 by suitable bearings generally indicated at 59. Said auxiliary section further includes a plurality of countershafts 66 and 67 (FIG. 3) each having an identical grouping of countershaft gears thereon, of which two appear at 68 and 69 (FIG. 1). The first pair of countershaft gears 68 are disposed diametrically opposite and in continuous meshing engagement with the main shaft gear 71, which main shaft gear is floatingly supported by the forward pair of countershaft gears, one being the gear 68 for substantially consecutively encircling the main shaft 23. A further main shaft gear 72 is also floatingly and substantially consecutively supported relative to the main shaft 23 by the rearward pair of countershaft gears, one being the gear 69. Shift forks 73 and 74, respectively, are provided for effecting the shifting of gears 71 and 72 and said shift forks are operable by appropriate shift rods of which one appears at 76 for operation by any desired means such as the pressure cylinder 77. Appropriate control means 78, a presently known type, is provided for properly effecting and interrelating control of the shift means for the forward gears 18 and 31-34 and the splitter gears 71 and 72.

The yieldable clutch structures are arranged between the shiftable main shaft gears in both the main transmission and the auxiliary section and are provided with resilient means for urging engagement thereof as set forth in detail in the above mentioned patents. While clutch means utilizing the blockers of the prior art are not identical with each other, they are generally similar and hence insofar as the present invention is concerned, it will be sufficient to describe only one of them in detail with the understanding that same may be applied to the other clutch units without difficulty by anyone skilled in the art. Therefore, for this purpose, referring to the positive jaw clutch unit positioned between the main shaft gear 72 and the main shaft 23 in the auxiliary transmission section (see FIG. 4), said jaw clutch unit is generally designated 41 and includes an annular clutch collar or clutch member 42 encircling the main shaft 23. The clutch collar 42 is provided with internal splines 43 which are disposed within corresponding external splines 44 provided on the main shaft 23 for interconnecting the clutch collar 42 to the main shaft 23 for rotation therebetween. However, the cooperating splines 43 and 44 permit the clutch collar 42 to freely slide axially relative to the shaft 23. A stop ring 46 is seated within a suitable groove formed on the external periphery of the shaft 23 and is disposed for contacting the clutch collar 42 and limiting the rightward axial movement thereof. The collar 42 is normally resiliently urged by means of a spring 47 into a butting engagement with the stop ring 46.

The clutch collar 42 is provided with external teeth 48 thereon which are adapted to meshingly engage the internal teeth 50 provided on one of the main shaft gears, such as gear 72, the internal teeth 50 form the other member of clutch 41. The teeth 48 on the clutch collar 42 are tapered, as at 51, and in a similar manner the leading edge of the teeth 50 on the main shaft gear 72 are similarly tapered at 52. The tapered conical surfaces 51 and 52 each extend at an angle of preferably between 30° and 40° relative to the longitudinal axis of the main shaft 23. The exact degree of taper, and the advantages thereof, are explained in detail in U.S. Pat. No. 3,265,173. The other end of the spring 47 resiliently acts against a further clutch collar 53 (FIG. 1) which collar is identical to the collar 42 but is disposed so that it has the tapered leading ends of teeth facing in the opposite direction.

Further resilient, substantially identical, clutch assemblies are provided for the other shiftable gear sets but same are set forth in detail in the above incorporated patents and hence further description thereof is unnecessary here.

Attention is now directed to the prior art blocker shown in the drawings herewith and incorporated into the jaw clutch unit as desired for operation therewith.

Figure 4:
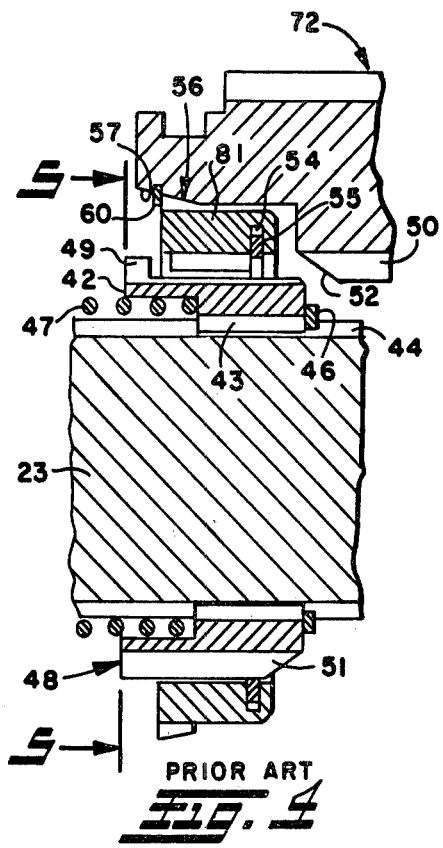
FIG. 4 is an enlarged fragmentary view of the jaw clutch structure utilized in connection with prior art blockers.
Figure 5:
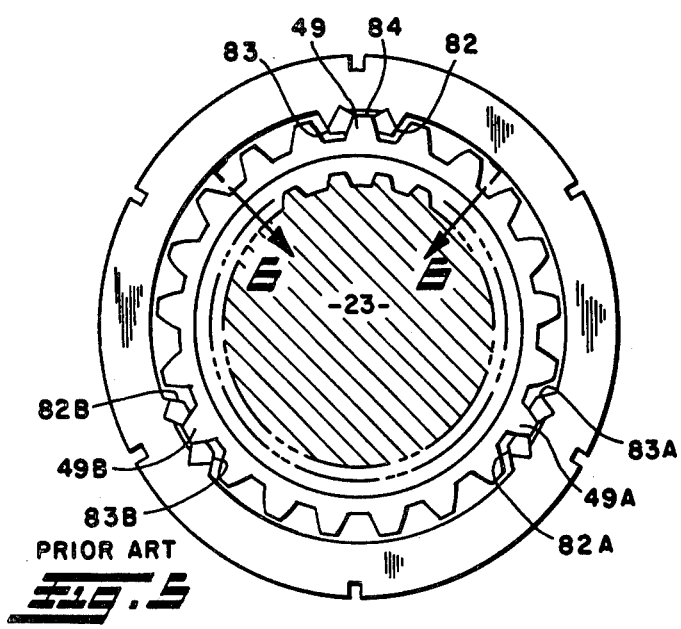
FIG. 5 is a sectional view of a prior art jaw clutch and blocker structure.
Figure 6:
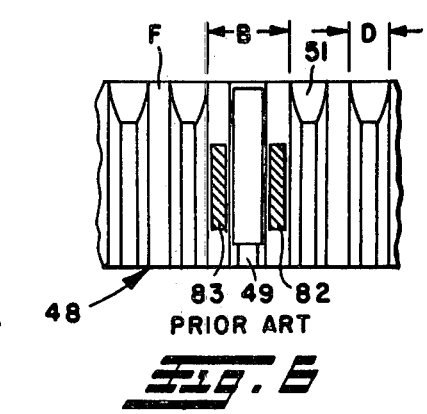
FIG. 6 is a fragmentary view showing the components of the prior art blocker in synchronous condition permitting shifting.
Figure 7:
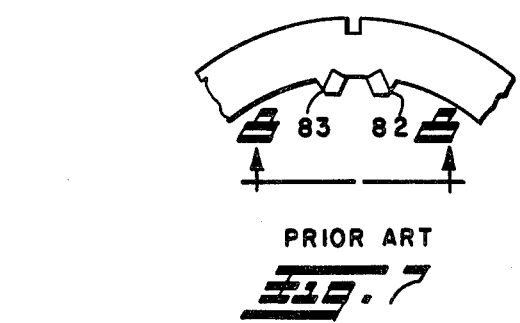
FIG. 7 is an enlarged fragmentary detail of the prior art blocker ring teeth taken from the same direction as shown in FIG. 5.
Figure 8:
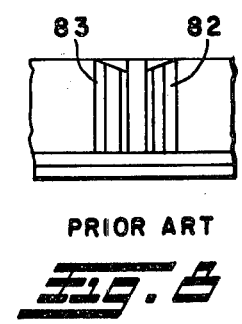
FIG. 8 is a view taken in the direction of the arrows VIII—VIII in FIG. 7.

Referring to FIG. 4, a selected number, here three, of the teeth 48 are partially removed for permitting the presence of a blocking ring as hereinafter further described. Such partial removal leaves, however, a shortened tooth 49 for cooperation with the blocking ring.

Referring now to the blockers of the prior art, which are illustrated in FIGS. 5 through 8, one thereof is indicated generally at 81, and comprises a ring encircling the clutch member 42 and has an appropriate number, here three pairs, of radially inward projections 82 and 83, which when properly positioned will mate with the external teeth above mentioned. The inward projections or teeth 82 and 83 are contoured at their sides to lie snugly against the adjacent ones of the teeth 48, and are positioned to project into the spaces between a partially removed tooth 49 and the teeth 48 on each side thereof. Each pair of teeth 82 and 83 are circumferentially of less dimension than the corresponding circumferential spaces defined by partially removing teeth 49 and thus blocker ring 81 may be rotated in either a limited clockwise or counterclockwise direction relative to clutch member 42 from the position seen in FIG. 5 in which the space between teeth 82 and 83 aligns with partially removed tooth 49. Contact of either blocker tooth 82 or 83 by a clutch tooth 48 will limit such relative rotation and cause blocker 81 to rotate with clutch member 42. The space, however, between the inwardly projecting teeth 82 and 83 is of a clearance distance wider than the corresponding circumferential dimension of the tooth 49 so that when properly aligned at synchronism (or more accurately, when the relative speeds of the clutch components cross synchronism) the teeth 82 and 83 will straddle the tooth 49 and the clutch member 42 can move axially through but not past blocker ring 81 to effect engagement with its corresponding clutch member integrally formed in a corresponding gear. As may be seen by reference to FIG. 8, the end faces of the blocker teeth 82 and 83 may be tapered.

As is described in greater detail by reference to U.S. Pat. Nos. 3,921,469 and 3,924,484, the radially inner side of ring 81 may be provided with an inwardly directed groove 54 which receives an annular resilient ring 55 which is normally of slightly less internal diameter than the external diameter of the teeth 48 so that when the parts are in the assembled condition, ring 55 is distorted slightly outwardly thereby to exert a light but definite pressure against the external surface of said teeth 48. Inasmuch as the ring 55 fits loosely and only in light frictional contact with the walls of the groove 48, this effects a significant resistance to axial movement between the blocker ring 81 and the clutch ring 48 but only an insignificant resistance to relative rotative movement therebetween.

A suitable conical surface 56 projects radially outwardly from the blocker ring 81 and is positioned for engagement with a similar conical surface 57 on a radially inner wall of the gear 72. The axial drive above mentioned is sufficient that the rotative driving effect of the surface 57 onto the blocker 81 is much greater than whatever rotative resistance may exist between the blocker 81 and the clutch member 42. A stop ring 60 limits movement of the blocker 81 away from the conical surface 57 when the clutch ring 42 moves out of engagement (leftwardly in FIG. 4).

The other two partially removed teeth corresponding to tooth 49 are indicated at 49A and 49B and internally extending teeth on the blocker ring corresponding to the teeth 82 and 83 are indicated at 82A and 83A for cooperation with the partial tooth 49A and at 82B and 83B for cooperation with the partial tooth 49B.

The operation of the blocker 81 is generally similar to that of known blockers, and in particular is substantially identical to those blockers described in U.S. Pat. No. 3,924,484. For example, assuming the gear 72 is rotating more rapidly than the clutch member 42, which, of course, rotates at the same speed as the main shaft 23, the blocker 81 will normally (ignoring for the moment the effect of the ring 55) tend to rotate with the gear 72, hence, lead the clutch member 42 and position the teeth 83, 83A, and 83B, in a position to interfere with the partial teeth 49, 49A, and 49B, respectively, to prevent axial clutching movement of the clutch component to the right. However, as the shaft 23 accelerates and a condition of synchronism is approached, the space between the inwardly projecting blocker teeth will become substantially centered with the partial teeth on the periphery of the clutch member 42 and upon reversal of the relative speeds, the blockers will no longer block and the clutch member 42 will move into clutching engagement in the usual manner.

With the gear 72 initially running slower than the shaft 23, the operation will be generally similar to that described above excepting that the blocker 81 will lag behind the clutch member 42 until there occurs a reversal of relative speeds, i.e., a passing through synchronous, at which time blocking will cease and clutching will again be completed in a manner already well known for blocking devices.

Considering now the effect of the compression or drag ring 55, it will be recognized that when there is no appreciable axial pressure rightwardly, as appearing in FIG. 4, on the blocker ring 81, there will be no appreciable friction between the conical surfaces 56 and 57 and hence no tendency for the blocker ring 81 to rotate with the gear 72. However, as the clutch member 42 commences to move axially rightwardly, the axial drag provided by the drag ring 55 urges the blocking ring 81 likewise axially to effect interengagement between the friction surfaces 56 and 57. Since the rotative driving force of the surface 57 onto the blocker ring is greater than the rotative resistance between the blocker ring and the clutch ring, the blocking ring 81 commences rotating with the gear 72 and does so prior to contact between the teeth of the blocker 81 and teeth of the clutch member 42.

The improved blocker means of the present invention is intended for use with the positive clutch structure for selectively clutching the main transmission section low speed main shaft gear 33, to the main shaft 23, and may be seen by reference to FIGS. 9 through 12.

Figure 9:
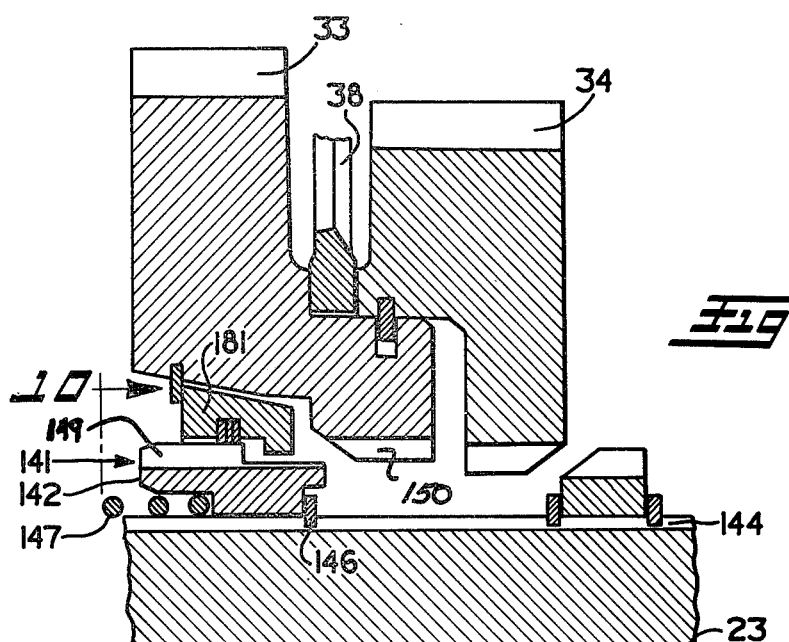
FIG. 9 is an enlarged fragmentary view of the jaw clutch structure utilizing the improved blocker of the present invention utilized to selectively clutch the low speed gear ratio main shaft gear to the main shaft.
Figure 11:
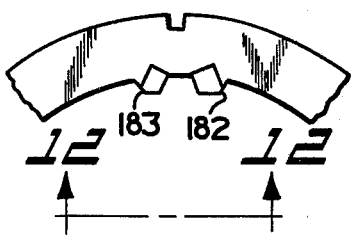
FIG. 11 is an enlarged fragmentary detail of the improved blocker ring of the present invention taken from the same direction as FIG. 10.
Figure 12:
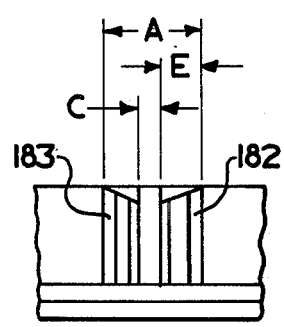
FIG. 12 is a view taken in the direction of the arrows 12—12 in FIG. 11.
Figure 10:
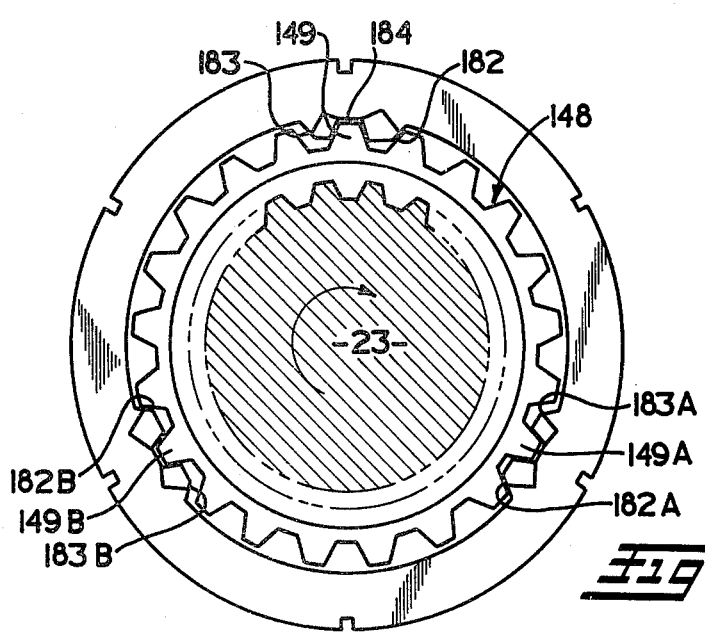
FIG. 10 is a sectional view taken along the line 10—10 in FIG. 9.

Referring to FIG. 9, a yieldable positive clutch unit, namely that positioned between the low speed main shaft gear 33 and the main shaft 23 in the main transmission section is illustrated, and is generally designated as 141. Yieldable clutch 141 includes an annular clutch collar, or clutch member, 142, encircling the main shaft 23. The clutch collar 142 is provided with internal splines 143 which are disposed within corresponding external splines 144 provided on the main shaft for interconnecting the clutch collar 142 to the main shaft for rotation therewith. However, the cooperating splines 143 and 144 permit the clutch collar 142 to freely slide axially relative to the main shaft 23. A stop ring 146 is seated within a seatable groove formed on the external periphery of the shaft 23 and is disposed for contacting the clutch collar 142 and limiting the axial movement thereof. The clutch collar or member 142 is normally resiliently urged by means of a spring 147 into a butting engagement with the stop ring 146.

The clutch collar 142 is provided with external teeth 148 thereon which are adapted to meshingly engage the internal teeth 150 provided on the low speed main shaft gear 33. The internal teeth 150 provided on the main shaft gear 33 comprise the other positive clutch member which together with clutch member 142 define the positive jaw clutch 141. The clutch teeth 148 and 150 may be tapered as at 151 and 152 as has been described in detail above in relation to clutch 41.

The improved blocker of the present invention is indicated generally at 181 and comprises a generally nondeformable ring encircling the clutch member 142 and has an appropriate number, here three pairs, of radially inwardly extending spaced projections or teeth, 182 and 183, which when properly positioned will mate with the external teeth above mentioned. The inward projections or teeth 182 and 183 are contoured at their sides to lie snugly against adjacent ones of the teeth 148 and are positioned to project into the spaces between a partially removed tooth 149 and of teeth 148 on each side thereof. The pair of teeth or projections 182 and 183 are, as a pair, of a circumferential dimension A less than the corresponding circumferential spacing B defined by partially removed teeth 149. The space C between the inwardly projecting teeth 182 and 183 is, however, of a clearance distance wider than the corresponding circumferential dimension D of the tooth 149 so that when properly aligned at synchronism (or, more accurately, when the relative speed of the clutch components cross synchronism) the teeth 182 and 183 will straddle the tooth 149 and the clutch component 142 can move axially through but not past the blocker ring 181 to effect engagement with clutch member 150 formed integrally with gear 33.

In sharp contrast to the prior art blocker 81 described above, the improved blocker of the present invention, 181, utilizes a pair of nonsymmetrical radially inwardly extending projections or teeth 182 and 183. In particular, inwardly extending tooth 182 is of substantially greater circumferential dimension E than radially inwardly extending tooth 183 and is of substantially equal circumferential dimension as the circumferential spacing F between partially removed tooth 149 and an adjacent tooth 148. Thus, the pair of inwardly extending teeth 182 and 183 are, on a proportional scale, of a circumferential dimension larger than the circumferential dimension of teeth 82 and 83 used in connection with prior art blocker 81 but are still of a lesser dimension than the spaces defined by the partially removed teeth 149. Thus, the degree of relative rotation permitted between the improved blocker 181 and the clutch member 142 is proportionally less than the degree of relative rotation permitted between the prior art blocker 81 and the clutch member 42.

Due to the fact that inwardly extending blocker tooth 182 is of a circumferential dimension E substantially equal to the spacing F between removed tooth 149 and the adjacent tooth 148, the blocker 181 will be permitted to move in the counterclockwise direction only to the extent that the partially removed tooth 149 will be aligned with the space between the teeth 182 and 183.

The blocker ring will, however, still have a clockwisemost position relative to the clutch member 142 similar to the clockwisemost position of prior art blocker 81 relative to clutch 42 whereat the inwardly projecting teeth 182 and 183 will interfere with the partially removed tooth 149 to block axial movement of clutch member 142. The blocker ring 181 of the present invention is thus effective to block axial clutch engagement only in situations wherein the blocker ring is rotated in a counterclockwise direction relative to the clutch member 142. The blocker ring is ineffective to block an axial clutch engagement when the blocker ring 181 is rotated to its clockwisemost position relative to the clutch member 142.

The blocker 181 and the clutch member 142 illustrated in FIG. 9 is a view taken from the front of the transmission, corresponding to the front of a vehicle, and, assuming a conventional Diesel engine, the countershaft 23 will be rotating in a clockwise direction. Thus, the blocker ring 181 will be rotated in a counterclockwise direction relative to clutch member 142 when the clutch member 142 is rotating faster than the blocker member 181 and will be in its clockwisemost position relative to the clutch member 142 when the clutch member 142 is rotating slower than the blocker member 181. As the clutch member 142 is splined to rotate with main shaft 23, and the blocker ring 181 may be frictionally engaged to tend to rotate with main shaft gear 33, the rotation of the clutch member 141 represents rotation of the output members of the transmission while the limited rotation of the blocker ring 181 relative to the clutch member 142 represents rotation of the input members of the transmission. Thus, the blocker 181 will only block a clutch engagement in the event that the output members (i.e., the main shaft 23) are rotating faster than the input members. The blocker will not sense a nonsynchronous condition and block a clutch engagement for the condition wherein the transmission input members (i.e., the main shaft gear 33) are rotating faster than the output members (i.e., the main shaft). It has been discovered that in a conventional truck transmission of the simple type or the compound splitter type, especially in a truck transmission wherein the power is provided by a Diesel engine, it is usually unnecessary when shifting into the low speed gear ratio to sense a condition wherein the input members of the transmission are rotating faster than the output members. This is because it is impossible to upshift into the low gear position of such transmissions. In a typical truck transmission, the main transmission section low speed main shaft gear will be rotating at a ratio of about 1:7.2 relative to the input shaft to the transmission. A standard Diesel engine idles at about 600 rpm and is usually governed to have a maximum rpm of between 1800 and 2100 rpm. Thus, even at a full stopped condition with the main shaft stationary (thus clutch member 142 stationary), the main shaft gear (thus clutch teeth 150) will be rotating at a speed of approximately only 85 to 100 rpm. Even in the unlikely event, that an operator would intentionally attempt to make a shift with the engine operating at its maximum rpm, the main shaft gear 33 would only be rotating at a maximum of approximately 250 rpm.

The end faces of the blocker teeth 182 and 183 may be tapered and an annular resilient ring 155 may be provided in an inwardly directed groove 154 for the same reason as the tapered teeth 82 and 83 and the ring 55 are utilized in connection with blocker 81 described above.

A suitable conical surface 156 projects radially outwardly from the blocker ring 181 and is positioned for engagement with a similar conical surface 157 on a radially inner wall of gear 33. A stop ring 160 limits movement of the blocker 181 away from the conical surface 157 when the clutch member 142 moves out of engagement (leftwardly in FIG. 9).

The other two partially removed teeth corresponding to the removed tooth 149 are indicated at 149A and 149B and internally extending teeth on the blocker ring corresponding to the teeth 182 and 183 are indicated at 182A and 183A for cooperation with the partial teeth 149A and as 182B and 183B for cooperation with the partial tooth 149B. It is understood that inwardly projecting teeth 182A and 182B need not be of a greater circumferential dimension than teeth 183, 183A or 183B as it is sufficient that a single tooth 182 will limit the clockwise rotation of the blocker relative to the clutch member.

The operation of the blocker 181 is generally similar to that of blocker 81 with the exception that the blocker will sense only one type of nonsynchronous condition. Incorporation of the improved blocker 181 as described into the system of a resiliently shiftable change gear transmission provides a transmission wherein the ability to shift into first gear is greatly enhanced. Further, the blocking ring 181 is of extremely simple construction, and yet is sturdy and effective to accomplish the objects of the invention including those specifically set forth above.

While the specific embodiment of the invention has been set forth herein for illustrative purposes, it is understood that the present disclosure of the preferred form has been made only by way of example and that numerous changes and the details of construction and combination and arrangement of the parts may be resorted to without departing from the spirit and the scope of the invention as hereinafter claimed.

I claim:

1. An improved blocker of the type comprising a substantially nondeformable blocker ring rotationally carried by a first of two axially engageable positive clutch members, said blocker ring having a limited degree of rotation relative to said first clutch member and at initiation of a clutch engaging operation operable to tend to rotate with said second clutch member, said blocker effective to sense nonsynchronous rotation of said clutch members corresponding to certain blocker ring rotation relative to said first clutch member to block relative axial engagement of said clutch members, the improvement comprising:

said blocker being effective to sense a first type of nonsynchronous condition wherein one of the clutch members rotates in a given direction faster than the other clutch member but ineffective to sense a second type of nonsynchronous condition wherein the other clutch member rotates in said given direction faster than the one clutch member.

2. The improved blocker of claim 1 wherein said first clutch member includes at least one blocking tooth extending radially toward said blocker and said blocker ring includes at least one pair of projections extending radially toward said first clutch member, said projections having a circumferential spacing therebetween sufficient to receive said blocking tooth when aligned therewith, one of said projections designed to interfere with a clutch tooth on said first clutch member to prevent said blocking ring from being rotated relative to said first clutch member in one of the clockwise and counterclockwise directions by an amount sufficient to cause said spacing to not align with said blocking tooth.

3. The improved blocker of claim 1 wherein one of said first clutch member and blocker ring includes a blocker tooth extending radially toward said other of one said clutch member and blocking ring and said other of said first clutch member and blocking ring includes a pair of spaced projections extending radially toward said one of said first clutch member and blocking ring, said projections having a space therebetween sufficient to allow passage of said blocking tooth, one of said projections and said blocker tooth being designed to prevent one of clockwise and counterclockwise rotations of said blocker ring relative to said first clutch member sufficient to cause said projections to interfere with passage of said tooth.

4. The improved blocker of claim 1 wherein said first clutch member comprises at least one partially removed tooth extending radially toward said blocker ring and said blocker ring comprises at least one pair of projections extending radially toward said first clutch member, said projections as a pair having a circumferential dimension smaller than the space defined by said partially removed tooth, the space between said projections sufficient to permit passage of said partially removed tooth and one of said projections having a circumferential extension smaller than the spacing between the clutch teeth of said first clutch member and the other of said projections having a circumferential extension substantially equal to the spacing between the clutch teeth of said first clutch member whereby said blocker may be rotated relative to said first clutch member from a position whereat said other projection contacts the clutch tooth adjacent the partially removed tooth only in the direction toward said one projection.

5. The improved blocker of claim 4 wherein said clutch comprises at least three equally circumferentially spaced partially removed teeth and said blocker ring comprises at least three circumferentially equally spaced pairs of projections, at least one of said pairs of projections having a said other projection of circumferential dimension generally equal to the spacing between the clutch teeth.

6. An improved blocker of the type comprising a substantially nondeformable blocker ring rotationally carried by a first of two axially engageable positive clutch members, said blocker ring having a limited degree of rotation relative to said first clutch member and, at the initiation of a clutch engaging operation, operable to tend to rotate with the second clutch member, said blocker effective to sense nonsynchronous rotation of said clutch members corresponding to certain conditions of blocker ring rotation relative to said first clutch member to block axial engagement of said clutch members, the improvement comprising:

means on one of said blocker ring and first clutch member for limiting one of counterclockwise and clockwise rotation of said blocker ring relative to said first clutch member from a predetermined circumferentially aligned position whereby said blocker is effective to sense a first type of nonsynchronous condition wherein one of the clutch members rotates faster in a given direction of rotation than the other clutch member but is ineffective to sense a second type of nonsynchronous condition wherein the other clutch member rotates faster in said direction of rotation than said one clutch member.

7. The improved blocker of claim 6 wherein said clutch comprises at least one partially removed tooth extending radially toward said blocker ring and said blocker ring comprises at least one pair of projections extending radially toward said first clutch member, said projections as a pair having a circumferential dimension smaller than the space defined by said partially removed tooth, the space between said projections sufficient to permit passage of said partially removed tooth and one of said projections having a circumferential extension smaller than the spacing between the clutch teeth of said first clutch member and the other of said projections having a circumferential dimension substantially equal to the spacing between the clutch teeth of said first clutch member.

8. An improved blocker and clutch assembly of the type comprising a substantially nondeformable blocker ring splined to a first of two axially engageable positive clutch members, said first clutch member comprising at least one partially removed tooth extending generally radially toward said blocker ring and said blocker ring comprising at least one pair of spaced projections extending generally radially toward said first clutch member, said pair of projections having a circumferential dimension smaller than the space defined by said partially removed tooth whereby said blocker has a limited degree of rotation relative to said first clutch member, said blocker ring tending to rotate with the second clutch member at the initiation of a clutch engaging operation, the space between said projections sufficient to permit passage of said partially removed tooth when aligned therewith, said blocker effective to sense nonsynchronous rotation of said clutch members corresponding to blocker ring rotation relative to said first clutch member to block relative axial engagement of said clutch members, the improvement comprising:

one of said projections having a circumferential extension smaller than the spacing between the clutch teeth of said first clutch member and the other of said projections having a circumferential dimension substantially equal to the spacing between the clutch teeth of said first clutch member whereby said blocker is effective to sense a first type of nonsynchronous condition whereat one clutch member rotates faster in a given direction of rotation than the other clutch member but is ineffective to sense a second type of nonsynchronous condition whereat the other clutch member rotates faster in said direction of rotation than the one clutch member.

9. The improved assembly of claim 8 wherein said blocker is ineffective to sense the nonsynchronous condition wherein said second clutch member overspeeds said first clutch member.

10. An improved interengageable jaw clutch system of the type comprising a first rotatable means and a first jaw clutch portion mounted thereon for axial sliding relationship therewith and positive rotation therewith, a second rotatable means coaxially related to said first means and a second jaw clutch portion arranged thereon for interengagement with the first jaw clutch portion upon relative axial movement of said jaw clutch portions toward one another, one of said jaw clutch portions having drive teeth at a radius suitable for engaging with clutch teeth on the other jaw clutch portion, said one jaw clutch portion having also blocking teeth, said blocking teeth having a leading portion and a trailing portion, said trailing portion extending radially beyond said leading portion, blocker means coacting between said first and second jaw clutch portions for positively preventing engagement of said jaw clutch portions so long as a substantial difference in the relative speed is sensed therebetween, said blocker means including an annular substantially nondeformable blocker ring having at least one pair of blocking portions arranged thereon and supported by said drive teeth for limited rotation with respect thereto and positioned axially between said blocking teeth and said clutch teeth when said jaw clutch portions are disengaged, said pair of blocking portions being provided with a space therebetween capable of receiving therein said blocking teeth trailing portion when said blocking teeth and said spaces are aligned to permit said blocking teeth to relatively move axially past said pair of blocking portions so that said jaw clutch portions can be engaged with one another, and a surface on said blocker frictionally cooperating with the surface on said second jaw clutch portion for causing said blocker ring to tend to rotate with said second jaw clutch portion, the improvement comprising:

said blocker effective in a given direction of rotation to sense one type of nonsynchronous condition wherein one of said jaw clutch portions overspeeds the other jaw clutch portion but ineffective to sense the other nonsynchronous condition wherein said other jaw clutch portion overspeeds the one jaw clutch portion.

11. The improved jaw clutch system of claim 10 wherein at least one of said blocking portions is of a circumferential extension generally equal to the spacing between said blocking teeth and the drive teeth adjacent said blocking teeth.

12. The improved jaw clutch of claim 11 wherein said blocking teeth are partially removed drive teeth and said circumferential extension is generally equal to the circumferential spacing between adjacent drive teeth on said first jaw clutch member.

* * * * *